G. W. C. GILLESPIE.
AXLE FOR WHEELED CULTIVATING PLOWS.
No. 8,348. Patented Sept. 9, 1851.
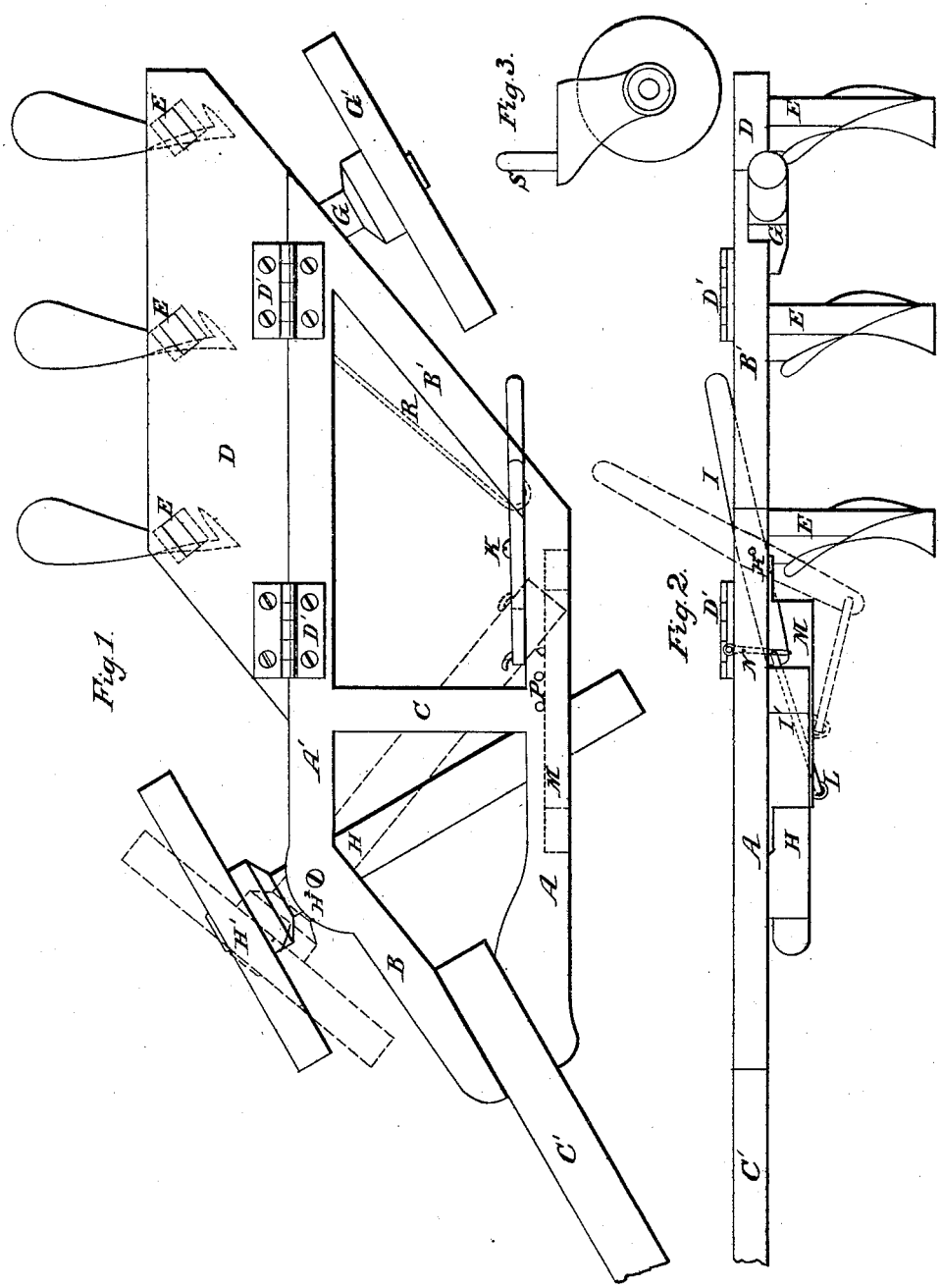

UNITED STATES PATENT OFFICE.

G. W. C. GILLESPIE, OF BURLINGTON, IOWA.

IMPROVEMENT IN AXLES OF WHEELED CULTIVATING-PLOWS.

Specification forming part of Letters Patent No. 8,348, dated September 9, 1851.

*To all whom it may concern:*

Be it known that I, G. W. C. GILLESPIE, of Burlington, in the county of Des Moines and State of Iowa, have invented a new and Improved mode of Constructing and Operating the Axles of Cultivators, Gangs of Plows, Seed-Drills, &c.; and I do hereby declare that the same is described and represented in the following specification and accompanying drawings.

Figure 1 is a top view; Fig. 2, an elevation of one side, omitting the wheels. Fig. 3 is a wheel in a small frame, that may turn under the frame of the cultivator.

The same letters refer to like parts in all the drawings.

When several plows are fastened to one frame, so as to be drawn by one team, each of which is designed to plow a furrow of the usual width and depth, it becomes necessary to place them a sufficient distance one behind the other diagonally in succession, so that the furrow turned by each plow will fall into the furrow or space left by the plow that preceded it, without interfering with each other, and as it is important that the axles and wheels should be so arranged that the point of contact of the wheels should be on a line parallel with the range of the plows, or nearly so, so that the first plow shall not draw too deep and bring a heavy pressure upon the necks of the cattle and cause the last plow to run too shallow, or so the last plow shall not draw too deep and make the first run too shallow and take the necessary pressure off of the necks of the cattle and throw up the gears, so as to choke them. Hence it is necessary to place the wheels diagonally one behind the other, so that the action of all the plows shall be between the wheels, for the reasons above stated; and it was found that when the wheels were so placed it was difficult to turn the carriage and plows so short as would be convenient and desirable without the risk of breaking the wheels, axles, or carriage. To remedy this the axle to the forward wheel was hung on a pivot fastened to the carriage, and so arranged as to be vibrated by a lever operated by the attendant, so as to bring the axle parallel to the radius of the circle formed by the track of the wheel, and when the axle is so brought the carriage and plows may be turned short around with facility without the risk of breaking any part of the apparatus.

The nature of my invention consists in hanging one or both of the axles of the wheels of the carriages of cultivators, gangs of plows, seed-drills, &c., to the frame of the carriage, when the plows or cultivators are placed diagonally one behind the other, so as to vibrate them by levers or other means or suffer them to vibrate of themselves, so as to assume a position at right angles to the track of the wheel when moving in a straight line, and when turning in a line nearly parallel to the radius of the circle formed by the track of the wheel, so that such carriages and their appurtenances may be turned about with facility without the risk of breaking the same.

To enable others skilled in the art to make and use my invention I will proceed to describe its construction and operation.

I make a frame of the form represented in the drawings, or of such other form as will answer the purpose, as two parallel bars, A A', and two other bars, B B', and a cross-bar, C, and fasten them together properly. The ends of the bars A and B form the hounds between which the tongue or pole C' is inserted and fastened in the usual manner. To this pole the horses or other animals are attached to draw the cultivator. To the bar A', I hang the frame or wide bar D, with the hinges D' D', so that said bar may be turned up to raise the cultivators attached to it, to be hereinafter described. In the bar D, I make three mortises and insert the tenons of the standards E E E, to which the points and shares of the cultivators are fastened. The axle G, upon which the hind wheel, $g'$, turns, is fastened to the junction of the bars A' and B'. The axle H, upon which the wheel H' turns, is fastened to the junction of the bars B and A' by the bolt $H^2$, upon which it vibrates freely when acted upon by the lever I and connecting-rod I', which is fastened to the lever I and to the axle H by the staple L, so that the axle H is moved by operating the lever I, so as to change the relative position of the wheel H', as it may be desirable or necessary, as represented by the dotted lines. The lever I is fastened to the bar A by the pin K, upon which it vibrates freely. The iron strap M, fastened to the bar A, holds the end of the axle H to the bar A and allows it to traverse as above described.

To use the cultivator, attach the animals to the pole in any convenient manner, the end of the lever I lying against the bar B', and the side of the axle K is against the forward end of the strap M, being braced there by the lever I and connecting-rod I', as the joint which connects them is above a straight line running from the pin K to the staple L, so as to hold the axles parallel to each other, and the wheels revolve parallel also, which is the proper position for the cultivator to move in a direct line.

When it is desirable to turn the cultivator, the frame or bar D is turned up so as to raise the cultivator shares and points clear of the ground. Then the lever I should be raised up to about the position represented by the red lines, either more or less, so as to bring the axle H and wheel H' to about the position shown in dotted lines, or so as to bring the axle H parallel to the radius of the circle formed by the track of the wheel H' in turning the carriage of the cultivator.

The axle H may be held in the required position by the pin N in one of the holes P until the cultivator is turned ready to pursue a direct course, when the pin N should be raised so as to let the lever I down to the bar B' and the axle H resumes the position represented parallel to the axle G.

I contemplate that the hind axle, G, may be hung like the forward one and connected to the lever I by a rod, as represented by the dotted line R, so as to vibrate both axles at the same time to facilitate turning short curves; also, that the wheels may be made small enough to turn under the frame, being hung in a small frame, (see Fig. 3,) with a pivot, S, upon the the top to turn in the frame of the cultivator, so that the frame containing the wheel will turn and adjust itself, so that the axles of the wheels will assume a direction at right angles to the direction in which the cultivator is moved.

What I claim as my invention, and desire to secure by Letters Patent, is—

Hanging one or both of the axles of the wheels to the carriages of cultivators, gangs of plows, seed-drills, &c., to the frame of the carriage, so as to vibrate the axle or axles, or suffer them to vibrate, and keep them at right angles to the motion of the plows when moving in a direct line, and when turning the plows to keep the axle or axles in the direction of the radius of the circle, or nearly parallel with the radius of the circle, formed by the track of the wheel turning upon said axle, when the plows constituting the gang are placed diagonally one behind the other in succession and the wheels to the carriage of the same are also placed diagonally one behind the other.

In testimony whereof I have hereunto signed my name in the presence of two subscribing witnesses.

G. W. C. GILLESPIE.

Witnesses:
W. THOMPSON,
JAMES LYNCH.